United States Patent [19]
Moroe et al.

[11] Patent Number: 5,959,450
[45] Date of Patent: Sep. 28, 1999

[54] METHOD OF AND APPARATUS FOR INSPECTING HEAD UNIT

[75] Inventors: Michiaki Moroe; Michiharu Motonishi; Hitoshi Yamazaki; Kazunari Takida, all of Niigata-ken, Japan

[73] Assignee: Alps Electric Co., Ltd., Tokyo, Japan

[21] Appl. No.: 09/014,298

[22] Filed: Jan. 27, 1998

[30] Foreign Application Priority Data

Jan. 27, 1997 [JP] Japan ..................................... 9-012379

[51] Int. Cl.⁶ .................................................... G01R 33/12
[52] U.S. Cl. .......................... 324/210; 324/210; 324/211; 324/212; 360/104; 360/105; 360/106; 360/107
[58] Field of Search ..................... 324/210–212; 360/104–107

[56] References Cited

U.S. PATENT DOCUMENTS 5,612,840   3/1997   Hiraoka et al. ..................... 360/104

*Primary Examiner*—Jay Patidar
*Attorney, Agent, or Firm*—Brinks Hofer Gilson & Lione

[57] ABSTRACT

A fastening portion 1a of a plate spring 1 of a head unit H supported by a support member 12 and an arm portion 1d is pressed by a pressurizing pin 22a to impart the same displacement to a slider 4 as a Z-height when the head unit is mounted to an apparatus. In this condition, the inclination of the slider 4 is measured, and, further, the arm portion 1d is twisted by a tool 30 to correct deformation in the roll direction. Since the plate spring 1 is corrected in the same condition as when the unit is mounted to the apparatus, an accurate correcting operation is conducted.

8 Claims, 10 Drawing Sheets

ROLL ANGLE DURING INSPECTION

ROLL ANGLE DURING INSPECTION

METHOD OF AND APPARATUS FOR INSPECTING HEAD UNIT

BACKGROUND OF THE INVENTION

1. Field of the Invention

The present invention relates to a method of and an apparatus for inspecting a head unit for hard disks or the like in which it is possible to inspect the mounting attitude of the slider of the head unit and in which the mounting attitude of the slider can be corrected after the inspection.

2. Description of the Related Art

FIG. 7 is a perspective view showing the construction of a head unit H for recording magnetic signals on a magnetic recording medium, such as a hard disk, and reading magnetic signals recorded on the magnetic recording medium.

Numeral 1 indicates a plate spring (gimbal). The base portion of the plate spring (gimbal) 1 constitutes a fastening portion (mounting portion) 1a to be fastened to a magnetic recording/reproducing apparatus, such as a hard disk apparatus. A reinforcing plate 2 is attached to this fastening portion 1a. The fastening portion 1a is connected to an elastically deformable portion 1c having a cutout window 1b at the center. The plate spring 1 mainly deflects at this elastically deformable portion 1c. The elastically deformable portion 1c is connected to an arm portion (load beam portion) 1d. In the arm portion 1d, the side portions of the plate spring material are bent to form flanges if. Due to the presence of these flanges 1f, the arm portion 1d does not easily undergo elastic deformation.

The forward end portion of the arm portion 1d of the plate spring 1 constitutes a slider support portion. In this portion, a slider 4 is supported through the intermediation of a flexure 3 that is formed of a thin plate spring. The flexure 3 has an adhesion member which is glued to the forward end of the arm portion 1d and a support member to which the slider 4 is glued and fastened, elastic deformation being possible between the adhesion member and the support member.

The slider 4 is formed of a ceramic material or the like. The lower surface of the slider, as seen in the drawing, constitutes an opposing surface ABS (air bearing surface) 4a to be opposed to a magnetic recording medium, such as a hard disk, and the upper surface of the slider, as seen in the drawing, constitutes a support surface 4b that is glued to the support member of the flexure 3. Further, in the opposing surface 4a, there is formed a groove 4c for adjusting the airflow (air bearing) between the opposing surface and the magnetic recording medium to set the hovering distance. On the trailing side end surface of the slider 4, there is provided a thin film element 5 forming a magnetic recording portion and a magnetic reading portion.

A lead wire 6 extends from the thin film element 5 along the upper surface of the plate spring 1 to the rear end thereof. Further, the lead wire 6 is covered with a protective tube 7 as needed.

As shown in FIG. 8, in a magnetic recording/reproducing apparatus, such as a hard disk apparatus, the fastening portion 1a of the plate spring 1 is fastened to a mounting surface 42a of an arm portion 42 in the main body of the apparatus, and the opposing surface 4a of the slider 4 is opposed to a magnetic recording medium (hard disk). The distance between the magnetic recording medium and the fastening portion 1a when the slider 4 is opposed to the surface of the magnetic recording medium is referred to as the Z-height. In the mounted state, with the Z-height being given, the elastically deformable portion 1c of the plate spring 1 is deflected. Due to this deflection, the opposing surface 4a of the slider 4 is pressed against the magnetic recording medium.

When the magnetic recording medium is at rest, the entire opposing surface 4a of the slider 4 is substantially in contact with the surface of the magnetic recording medium. When the magnetic recording medium (hard disk) starts to move, the opposing surface 4a of the slider 4 is raised by an airflow on the surface of the magnetic recording medium, and the slider 4 hovers over the surface of the magnetic recording medium or is held in slight contact therewith. At this time, the magnetic recording medium moves in the X (−) direction, and the X (+) side of the slider 4 is the reading side, the X (−) side being the trailing side.

In this head unit H, it is necessary to appropriately set the attitude of the slider 4 when the magnetic recording medium (hard disk) is running in the X (−) direction. The attitude of the slider 4 influences, for example, the spacing between the magnetic recording medium and the magnetic recording portion and the magnetic reading portion of the thin film element 5. Recently, the recording density of a hard disk or the like has become very high, and the distance between the surface of the moving magnetic recording medium and the slider 4 has become very short. In an apparatus of the type in which the slider 4 moves over the magnetic recording medium with a small hovering distance therebetween or moves while being held in slight contact therewith, the attitude of the slider 4 while the magnetic recording medium is moving is liable to be unstable. Thus, to achieve, for example, an appropriate spacing in high density recording, it is important to stabilize the elastic support condition for the slider 4 to thereby stabilize the attitude of the slider 4 while the magnetic recording medium is moving.

The inclination of the slider 4 occurs in the Y-axis (pitch direction) and in the X-axis direction (roll direction). The pitch direction coincides with the direction in which the arm portion 1d of the plate spring 1 extends, so that the fluctuation in the inclination of the attitude of the slider 4 in the pitch direction while the magnetic recording medium is running in the X (−) direction can be restrained relatively easily by the plate spring 1, whereas the attitude of the slider 4 in the roll direction is unstable, so that it is necessary to perform adjustment so as to prevent the generation of an unnecessary inclination of the slider 4 in the roll direction during the manufacturing process of the head unit H, when the head unit H is still in the form of a unitary component.

Conventionally, the adjustment of the attitude of the slider 4 in the head unit H has been conducted as shown, for example, in FIG. 9. The lower surface (Z (−)) side surface) of the arm portion (load beam portion) 1d of the plate spring 1 (gimbal) is abutted against a reference surface 40a of a measurement jig 40 and fixed thereto, and, in this condition, the inclination of the opposing surface 4a of the slider 4 is measured. Conventionally, in this measurement, when the opposing surface 4a of the slider 4 has been inclined in the roll direction (around the X-axis), the forward portion of the arm portion 1d is held by a tool 30, with the arm portion 1d being abutted against the reference surface 40a of the measurement jig 40, and the tool 30 is twisted around the X-axis to adjust the inclination angle of the opposing surface 4a of the slider 4.

However, in many cases, when the head unit H adjusted by the conventional adjusting operation is actually mounted on a magnetic recording/reproducing apparatus, and the attitude of the slider 4 while the magnetic recording/reproducing medium (hard disk) is running is observed, the inclination thereof in the roll direction (around the X-axis) is found to be not completely adjusted by the correcting operation.

This is due to the following reasons:
(1) The initial twisting of the plate spring 1 when the head unit H is in the free state (static attitude) occurs between the fastening portion 1a and the elastically deformable portion 1c, in the elastically deformable portion 1c, between the elastically deformable portion 1c and the arm portion 1d, and in the arm portion 1d. Further, there are the twisting due to the attachment of the flexure 3 to the front portion of the arm portion 1d, the twisting of the flexure 3, and the twisting due to the attachment of the slider 4 to the flexure 3. Thus, when the fastening portion 1a of the plate spring 1 is fastened to the arm portion 42 of the magnetic recording/reproducing apparatus, all the static twistings mentioned above are accumulated from the fastening reference surface (mounting surface 42a) of the arm portion to the slider 4.

Thus, as in the conventional example shown in FIG. 8, in the method in which the arm portion 1d of the plate spring 1 is supported and in which the inclination of the slider 4 is measured by using this arm portion 1d as the reference, it is impossible to take into account the deviation in the attitude of the slider 4 attributable to the static twistings: the twisting between the fastening portion 1a and the elastically deformable portion 1c, the twisting in the elastically deformable portion 1c, and the twisting between the elastically deformable portion 1c and the arm portion 1d. Further, if the twisting deformation in the roll direction of the slider 4 is corrected by the tool 30 by using the arm portion 1d as the reference, it is impossible to correct the twisting deformation of the slider 4, that is, the static twisting deformation of the plate spring 1 as a whole, by using the fastening portion 1a of the plate spring 1 as the reference.

(2) As shown in FIG. 9, when the head unit H is mounted on a magnetic recording/reproducing apparatus, and a Z-height with respect to the magnetic recording medium is given, the plate spring 1 is deflected in the Z-direction, and a resilient force in the direction of the magnetic recording medium is applied to the slider 4. As in the above-described conventional example, in the inspection method in which the twisting in each portion of the plate spring 1 is measured in the free state (static attitude) in which no deformation is given to the plate spring 1, it is impossible to know the twisting deformation of the entire support structure for the slider 4 in the condition in which a Z-height is given in an actual magnetic recording/reproducing apparatus. Further, even if the head unit H is supported in the static attitude and the twisting of the slider 4 in the roll direction is corrected, it is not always possible to appropriately set the attitude of the slider 4 in the condition in which the head unit is mounted on a magnetic recording/reproducing apparatus and a Z-height is given.

(3) The factors influencing the attitude of the slider 4 in the condition in which the head unit H is mounted on a magnetic recording/reproducing apparatus and in which the slider 4 is opposed to a magnetic recording medium that is running, include: the resilient force of the plate spring 1 with respect to the slider 4 in the condition in which a Z-height is given; the natural frequency of the entire support structure supporting the slider 4; the airflow between the opposing surface 4a of the slider 4 and the magnetic recording medium; the positional relationship between the pivot serving as the support fulcrum of the slider 4 and the slider 4 (the positional relationship of the slider 4 with respect to the arm portion 1d), etc. However, the twisting deformation of the plate spring 1 in the static attitude and the twisting deformation of the plate spring 1 in the condition in which a Z-height is given greatly influence the deviation in the attitude in the roll direction of the slider 4 opposed to the magnetic recording/reproducing apparatus. Thus, it is difficult to stabilize the attitude of the slider 4 by using the measurement and correction processes as used in the conventional inspection method, in which the twisting deformation of the entire plate spring 1 in the static attitude is not taken into account and in which the inclined attitude of the slider 4 in the condition in which the Z-height is given is not taken into account.

SUMMARY OF THE INVENTION

The present invention has been made with a view toward solving the above problem in the prior art. It is an object of the present invention to provide a head unit inspection method which makes it possible to measure the inclination of the slider due to the twisting deformation of the entire plate spring and to measure the inclination of the slider in a condition akin to the condition in which it is actually mounted on a magnetic recording/reproducing apparatus.

Another object of the present invention is to provide a head unit inspection method which makes it possible to correct twisting deformation of the entire plate spring and deformation of the plate spring in the mounted state, in which the slider is opposed to the magnetic recording medium.

In accordance with the present invention, there is provided a head unit inspecting method for a head unit which includes a slider which has at least one of a magnetic recording portion and a magnetic reading portion and which is opposed to a recording medium, and a plate spring which supports the slider and which has a fastening portion to be fastened to an apparatus, the plate spring generating a predetermined amount of deflection in a using condition in which the slider is opposed to the recording medium to impart a predetermined resilient force in the direction of the recording medium to the slider, wherein the fastening portion of the plate spring is fastened and an amount of deflection corresponding to the condition in which the slider is opposed to the recording medium is imparted to the plate spring, the inclination of the surface of the slider opposed to the recording medium being measured, with the above-mentioned deflection being imparted to the plate spring.

The plate spring includes a fastening portion to be fastened to an apparatus, an elastically deformable portion in front of the fastening portion, an arm portion which is in front of the elastically deformable portion and which is restrained in terms of elastic deformation, and a slider support portion at the forward end of the arm portion, the arm portion being pressurized to impart deflection to the elastically deformable portion.

In the above-described construction, after the measurement of the inclination of the slider surface opposed to the recording medium, the arm portion is constrained through the intermediation of a gap in the thickness direction, and a correcting force is applied to the arm portion at a position in front of the constrained portion, whereby it is possible to correct the inclination of the slider.

In this case, it is desirable that the size of the gap when constraining the arm portion through the intermediation of the gap be such that no plastic deformation is generated in the elastically deformable portion when the correcting force is applied to the arm portion.

Further, in accordance with the present invention, there is provided a head unit inspecting apparatus for a head unit which includes a slider which has at least one of a magnetic recording portion and a magnetic reading portion and which is opposed to a recording medium, and a plate spring which supports the slider and which has a fastening portion to be fastened to an apparatus, the plate spring generating a predetermined amount of deflection in a using condition in which the slider is opposed to the recording medium to impart a predetermined resilient force in the direction of the recording medium to the slider, the head unit inspecting apparatus comprising: a support member for fastening the fastening portion of the plate spring; a pressurizing member which imparts an amount of deflection corresponding to the condition in which the slider is opposed to the recording medium to the plate spring; and an inclination measuring means for measuring the inclination of the surface of the slider opposed to the recording medium, with the plate spring being pressurized by the pressurizing member.

The plate spring comprises: a base portion fastened to an apparatus; an elastically deformable portion in front the base portion; an arm portion which is in front of the elastically deformable portion and which is restrained in terms of elastic deformation; and a slider support portion which is at the forward end of the arm portion, the pressurizing member being provided at a position where the arm portion can be pressurized.

In the above-described construction, there is provided a constraining member for constraining the arm portion in the thickness direction through the intermediation of a gap, with the arm portion being pressurized by the pressurizing member so that a predetermined amount of deflection is imparted to the elastically deformable portion of the plate spring. Due to this constraining member, the arm portion can be constrained, leaving a correctable portion in front of it.

In this case, it is desirable that the size of the gap between the constraining member and the arm portion be such that no plastic deformation is generated in the elastically deformable portion when correcting force is applied to the arm portion which is in front of the constraining member.

The head unit of the present invention is mounted on a magnetic recording/reproducing apparatus, such as a hard disk apparatus. Alternatively, it is used in a disk apparatus of a magneto-optical recording system for the purpose of imparting a recording magnetic field to a magneto-optic disk. A magnetic recording portion or a magnetic reading portion or both of them are mounted on the slider. These are formed by thin film elements, or are of a bulk type, which uses a magnetic core and a coil.

The spring may be a flat gimbal. However, in the present invention, a spring as shown in FIG. 7 is suitable, which includes a fastening portion 1a, an elastically deformable portion 1c, and an arm portion 1d, the forward end of the arm portion 1d constituting the support portion for the slider 4.

Further, for example, an autocollimator is used as the measuring means for measuring the inclination of the surface of the slider opposing the recording medium. This autocollimator applies a detection beam spot of a predetermined configuration to the surface of the slider opposing the recording medium, and detects an image of the spot formed on the slider. By optically detecting the spot image on the opposing surface of the slider, it is possible to measure the degree and direction of inclination of the slider. The measuring means may also be a contact type measuring means.

In the present invention, the inclination of the slider is measured, with the fastening portion of the plate spring (gimbal) being fastened, so that it is possible to perform measurement taking into account the total twisting deformation from the fastening portion of the plate spring to the slider support portion. Further, since the plate spring is corrected in this condition, when the plate spring is secured in position and the inclination of the slider is corrected, it is possible to set the attitude of the slider after the correction in an optimum manner.

Further, since a deflection which is the same as when the head unit is mounted on a magnetic recording/reproducing apparatus and a Z-height is given is imparted to the plate spring, and, in this condition, the inclination of the slider is measured and the deformation such as the twisting of the plate spring is corrected, it is possible to reliably correct the inclination of the slider when the head unit is actually mounted on an apparatus.

BRIEF DESCRIPTION OF THE DRAWINGS

FIGS. 10A and 10B are charts showing the relationship between slider inclination angle inspection results and the inclination angle of a slider mounted, of which FIG. 10A is a chart showing results of obtained by a conventional inspection method, and FIG. 10B is a chart showing results of obtained by the inspection method of the present invention.

DETAILED DESCRIPTION OF THE PREFERRED EMBODIMENT

Figure 1:
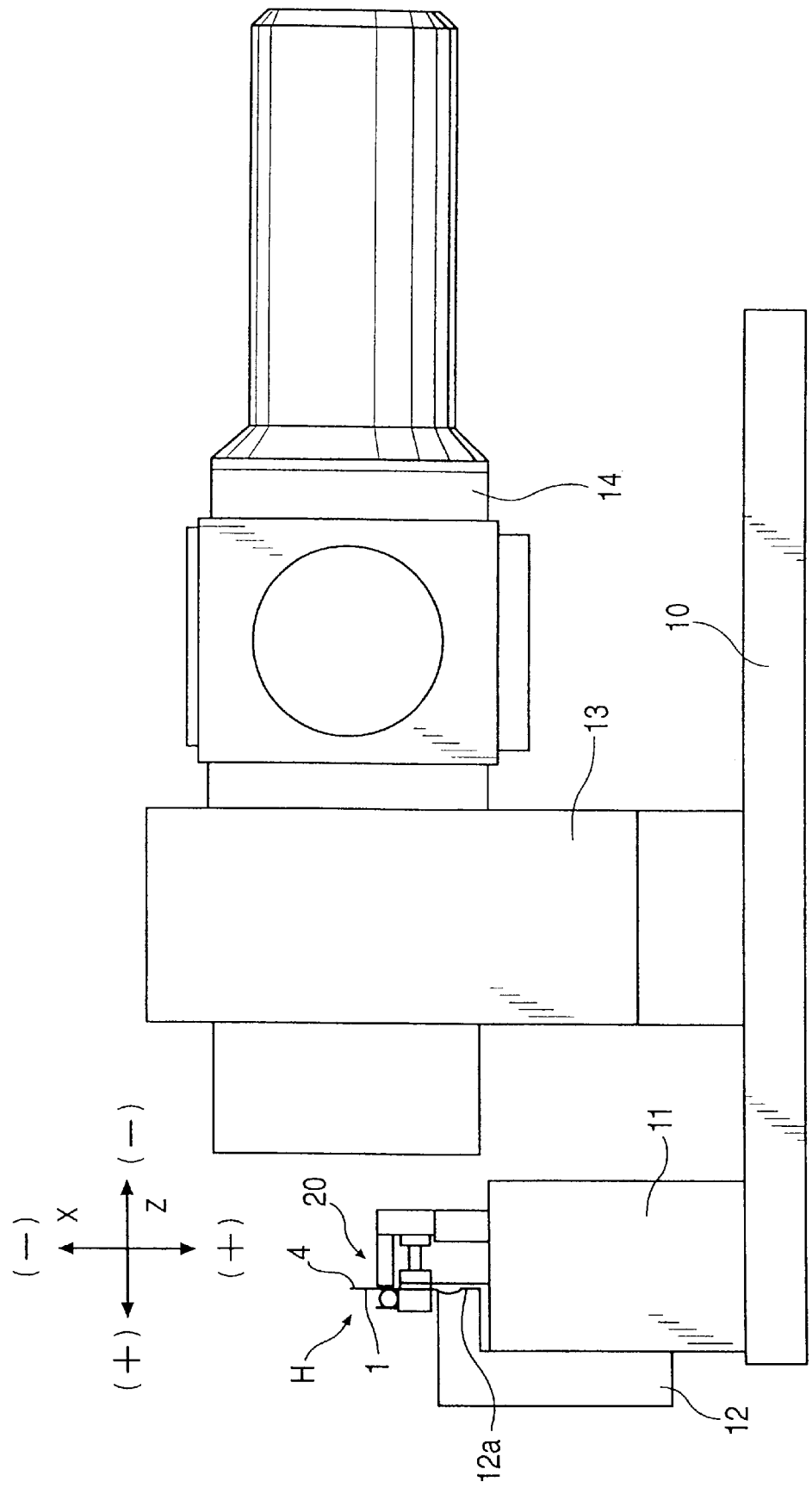
FIG. 1 is a front view showing the general construction of a head unit inspecting apparatus in accordance with the present invention.
Figure 2:
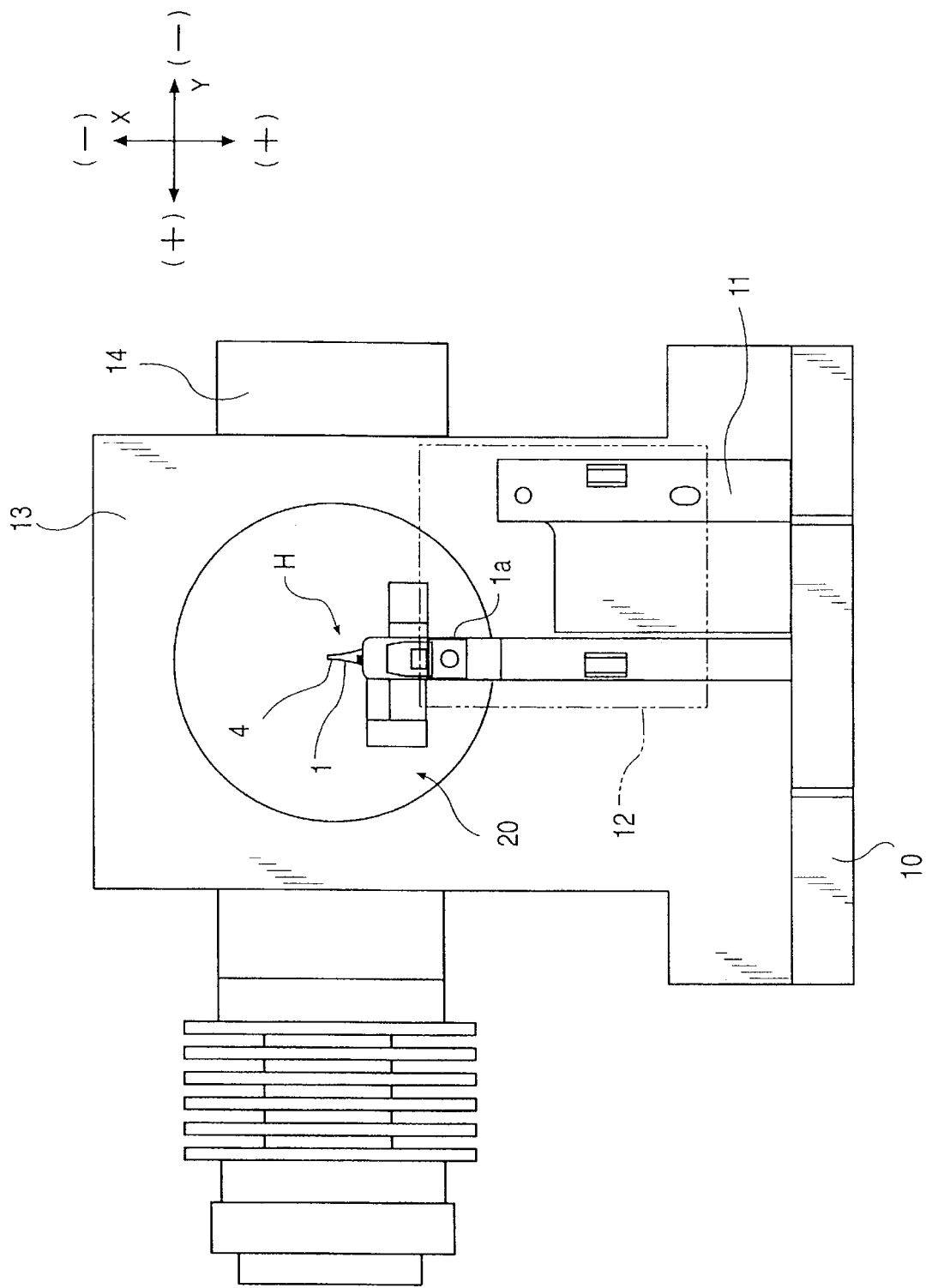
FIG. 2 is a left-hand side view of FIG. 1.
Figure 3:
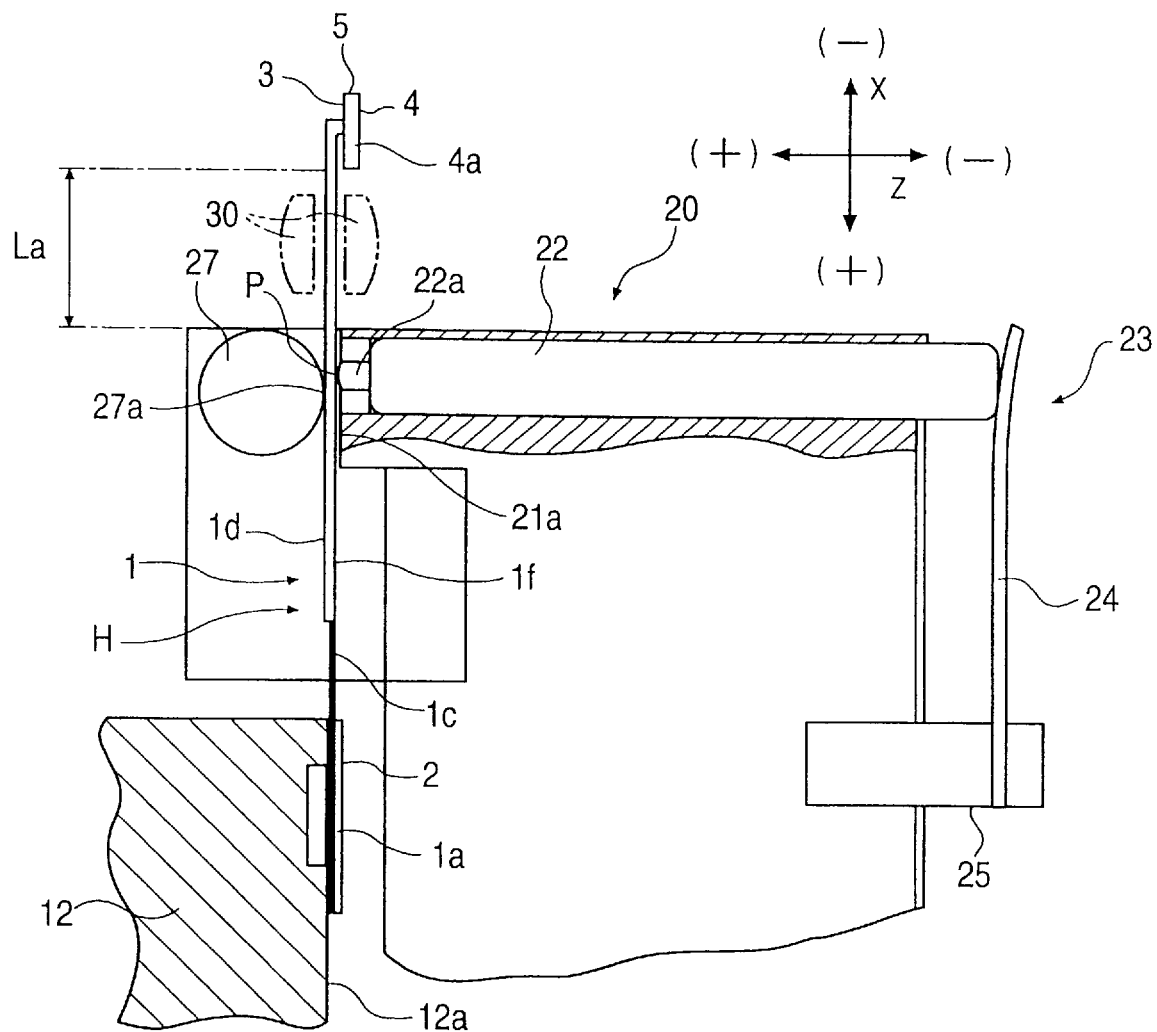
FIG. 3 is an enlarged view showing a part of the inspecting apparatus shown in FIG. 1.
Figure 4:
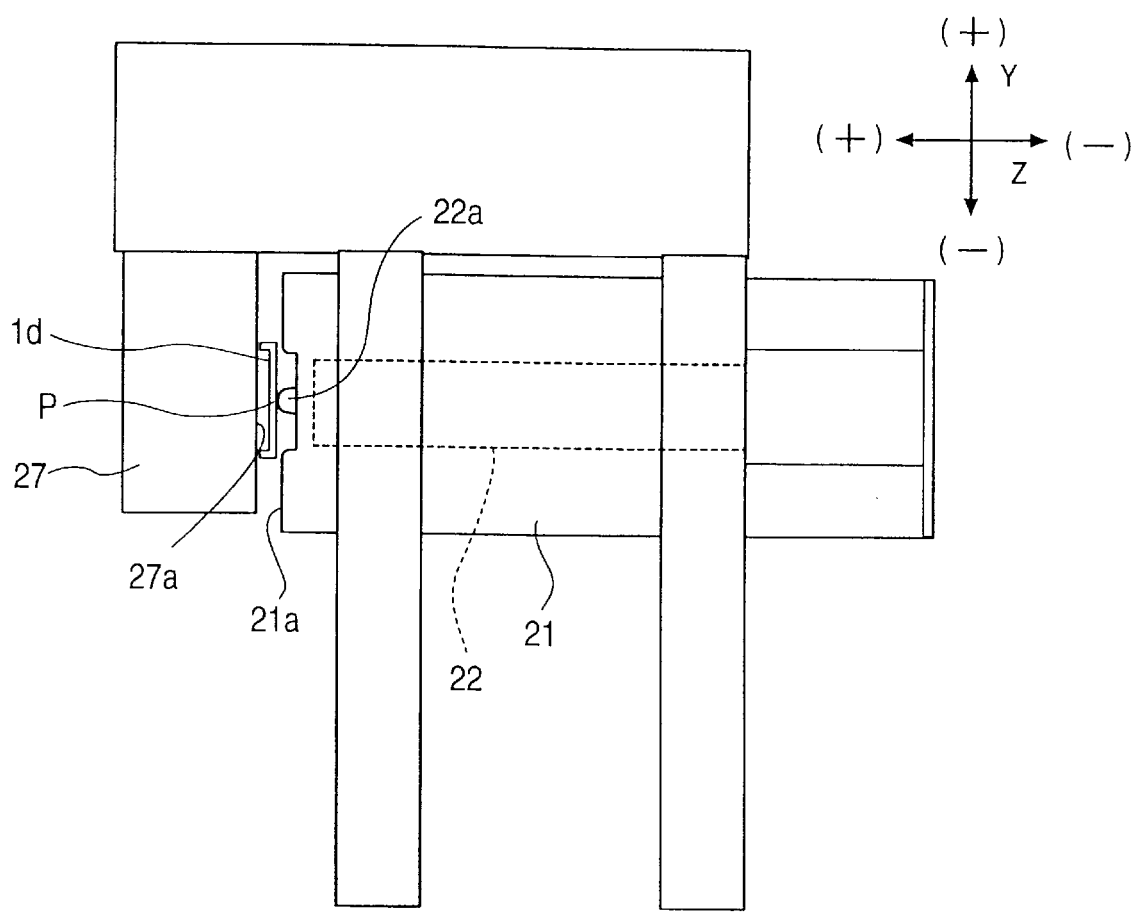
FIG. 4 is a plan view of FIG. 3.
Figure 5:
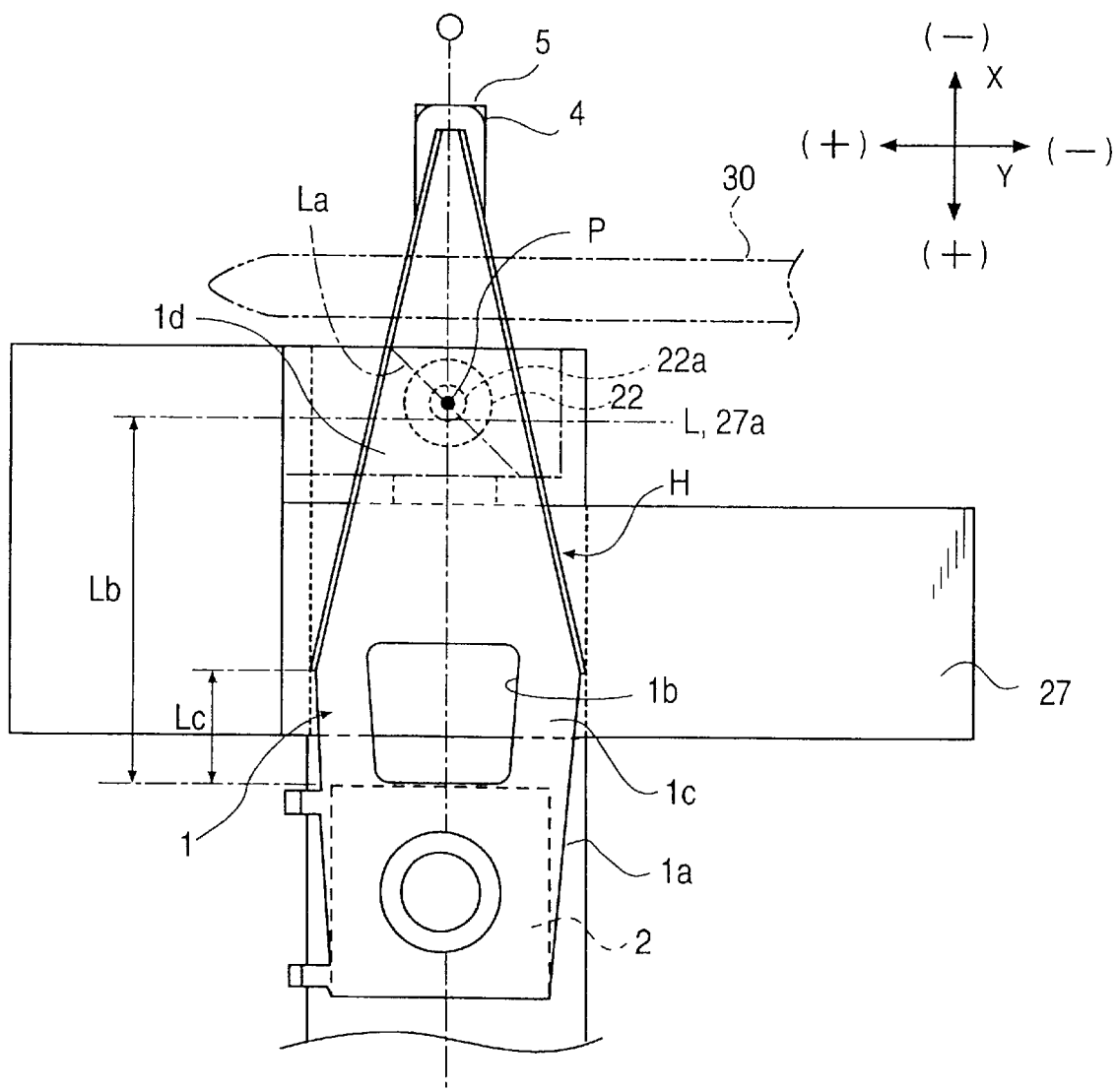
FIG. 5 is a left-hand side view of FIG. 3.

FIG. 1 is a front view showing a head unit inspecting apparatus (inspecting/correcting apparatus) in accordance with the present invention; FIG. 2 is a left-hand side view of FIG. 1; FIG. 3 is an enlarged view showing a part of the inspecting apparatus shown in FIG. 1; FIG. 4 is a plan view of FIG. 3; and FIG. 5 is a left-hand side view of FIG. 3.

Figure 7:
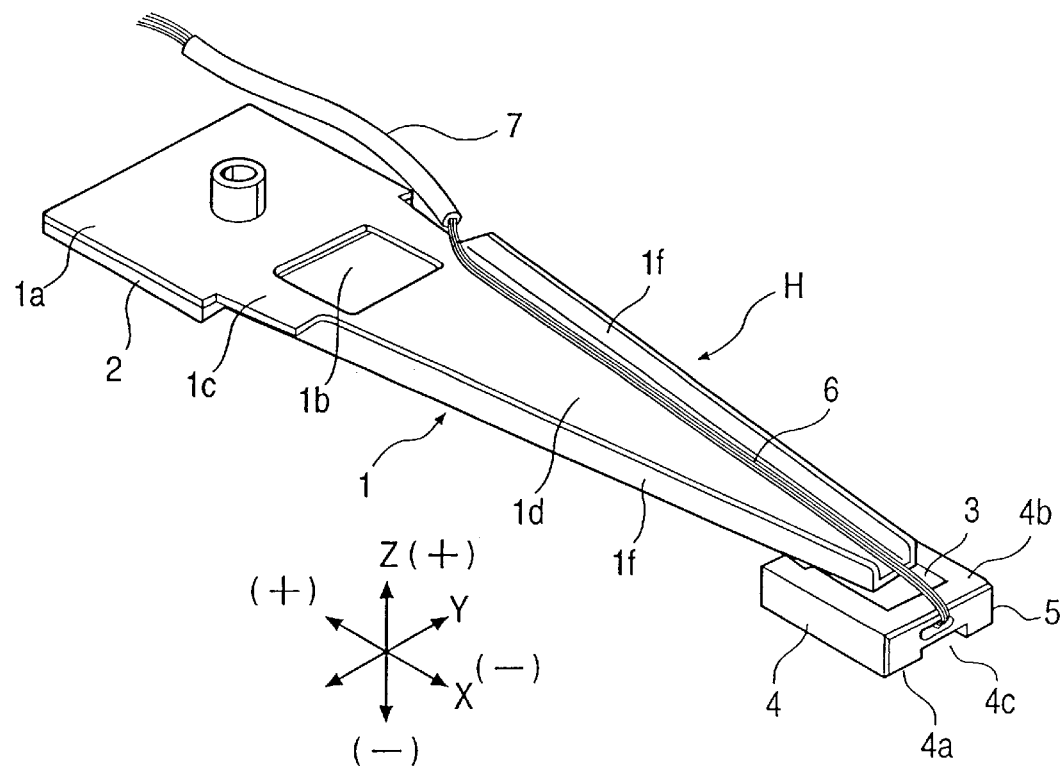
FIG. 7 is a perspective view showing the general construction of a head unit.

In the inspection apparatus shown in the drawings, it is possible to measure the inclination of the attitude of the slider 4 of the head unit H shown in FIG. 7 and to correct the inclination, making it possible to inspect the attitude of the slider 4 after the correction of the inclination.

In the head unit H shown in FIG. 7, the plate spring (gimbal) 1 extends in the tangential direction (the X-direction) of the recording track of the magnetic recording medium (hard disk); the X (+) side is the reading side and the X (−) side is the trailing side. The base portion of the plate spring 1 constitutes the fastening portion (mount portion) 1a to be fastened to a magnetic recording/ reproducing apparatus, such as a hard disk apparatus. A reinforcing plate 2 is attached to this fastening portion 1a. The fastening portion 1a of the plate spring 1 is connected to an elastically deformable portion 1c having a cutout window 1b at the center. In this plate spring 1, mainly the elastically deformable portion 1c deflects. The elastically deformable portion 1c is connected to an arm portion (load beam portion) 1d. In the arm portion (load beam portion) 1d, the side portions of the plate spring material are bent so as to form flanges 1f, and, due to the formation of these flanges If, elastic deformation of the arm portion 1d is restrained.

The forward end of the arm portion 1d constitutes a slider support portion, which supports a slider 4 through the intermediation of a flexure 3 formed of a thin plate spring. The flexure 3 has an adhesive member to be glued to the forward end of the arm portion 1d and a support member to which the slider 4 is glued and secured, elastic deformation being possible between the adhesive member and the support member. In the forward end portion of the arm portion 1d, there is formed a pivot protruding in the Z (−) direction, and the slider 4 can be inclined using this pivot as the fulcrum.

The slider 4 is formed of a ceramic material or the like, and the lower side thereof as seen in the drawing constitutes an opposing surface (ABS surface) 4a facing a magnetic recording medium, such as a hard disk; the upper side thereof as seen in the drawing constitutes a support surface 4b to be glued to the support member of the flexure 3. In the opposing surface 4a, there is formed a groove 4c for adjusting an airflow (air bearing) between the opposing surface and the magnetic recording medium and to set the hovering distance. On the trailing side end surface of the slider 4, there is formed a thin film element 5 forming a magnetic recording portion and a magnetic reading portion.

A lead wire 6, which extends from the thin film element 5, extends toward the rear end along the upper surface of the plate spring 1. Further, the lead wire 6 is covered with a protective tube 7 as needed.

Figure 8:
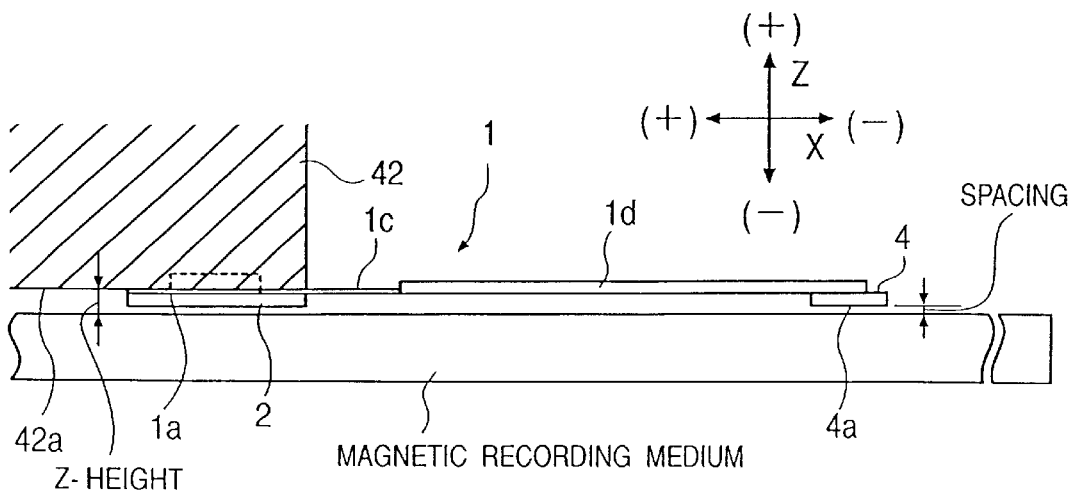
FIG. 8 is a partial enlarged view showing how a magnetic head is mounted.
Figure 9:
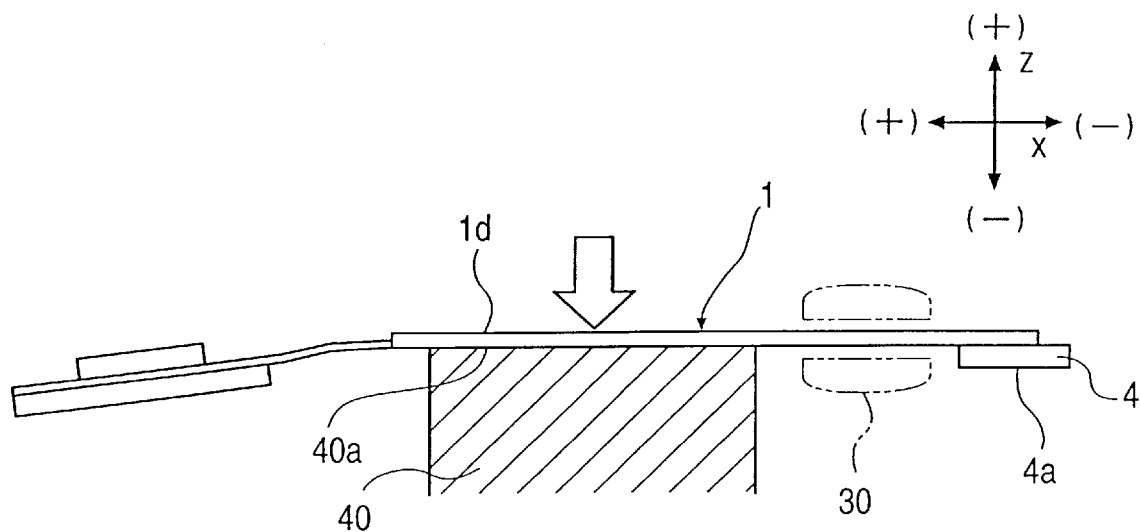
FIG. 9 is a diagram illustrating a conventional inspection method and a conventional plate spring correcting method.

In a magnetic recording/reproducing apparatus, such as a hard disk, the fastening portion 1a at the base of the plate spring 1 is fastened to an arm portion in the main body of the apparatus, and the opposing surface 4a of the slider 4 faces a magnetic recording medium (hard disk). In the mounted condition in which the slider 4 is opposed to the surface of the magnetic recording medium, a Z-height, shown in FIG. 8, is given, and the elastically deformable portion 1b of the plate spring 1 is deflected.

When the magnetic recording medium is at rest, the entire opposing surface 4a of the slider 4 is substantially in contact with the surface of the magnetic recording medium. When the magnetic recording medium (hard disk) starts to move, the opposing surface 4a of the slider 4 is raised by the airflow on the surface of the magnetic recording medium, and the slider 4 hovers over the surface of the magnetic recording medium or is held in slight contact therewith. In this attitude, a magnetic signal is recorded on the magnetic recording medium by the thin film element 5, or a magnetic signal recorded on the magnetic recording medium is read.

In the head unit inspecting apparatus (inspecting/ correcting apparatus), the head unit H is supported in the left-hand side portion as seen in FIG. 1.

The general construction of the inspection apparatus will be described. On the left-hand side as seen in the drawing of a base 10, there is provided a support base 11, and a support member 12, to which the fastening portion la of the head unit H is fastened, is provided on the support base 11. In the upper portion of the support base 11, there is provided a pressurizing/constraining portion 20 which applies a pressurizing force to the arm portion 1d of the plate spring 1 of the head unit H and which constrains the arm portion 1d for the purpose of correction.

Further, over the base 10, there is provided an autocollimator 14 serving as the measuring means for measuring the inclination of the slider 4 of the head unit H; this autocollimator 14 is supported by a support base 13 and secured thereto.

In FIG. 1 and other drawings, coordinate directions are given so as to be in correspondence with the X-Y-Z coordinates shown in FIG. 7. The autocollimator 14 shown in FIGS. 1 and 2 emits a detection beam in the Z (+) direction and forms a spot image of the detection beam on the opposing surface 4a of the slider 4 of the head unit H. This spot image is, for example, cross-shaped. In the autocollimator 14, any distortion in the shape of the spot image formed on the opposing surface 4a is observed, whereby the inclination of the opposing surface 4a can be inspected.

FIGS. 3 through 5 are enlarged views showing the construction of the above-mentioned pressurizing/constraining portion 20.

As shown in FIG. 1, the support member 12, to which the head unit H is secured, is detachable with respect to the support base 11, and the support member 12 is positioned with respect to the support base 11 and secured thereto. The forward end of the upper portion of the support member 12 constitutes a fastening surface 12a for the head unit H, and the fastening portion 1a at the base of the plate spring 1 of the head unit H is brought into close contact with this fastening surface 12a and positioned before being secured thereto. That is, the head unit H to be measured is positioned on the fastening surface 12a of the support member 12 before being secured thereto, and then the support member 12 is positioned with respect to the support base 11 and secured thereto.

As shown in FIG. 3, in the upper portion of the support base 21 of the pressurizing/constraining portion 20, a pressurizing shaft 22 is held so as to be capable of advancing and retracting in the Z-axis direction, and, at the forward end of this pressurizing shaft 22, a pressurizing pin 22a constituting the pressurizing member is integrally formed. The forward end of the pressurizing pin 22a has a spherical configuration and is held in one-point contact with the arm portion 1d of the plate spring 1 of the head unit H to pressurize the arm portion id in the Z (+) direction. The pressurizing point P of the pressurizing pin 22a against the arm portion 1d is positioned in the center line O of the head unit H, as shown in FIG. 5. The center line O is an imaginary line passing the center with respect to the width direction of the slider 4 and the center line with respect to the width direction of the plate spring 1.

A pressurizing force setting portion 23 is positioned on the support base 21. The pressurizing force setting portion 23 is composed of a pressurizing member 24 for elastically pressurizing the pressurizing shaft 22 in the X (+) direction and a pressurizing member support portion 25.

Figure 6:
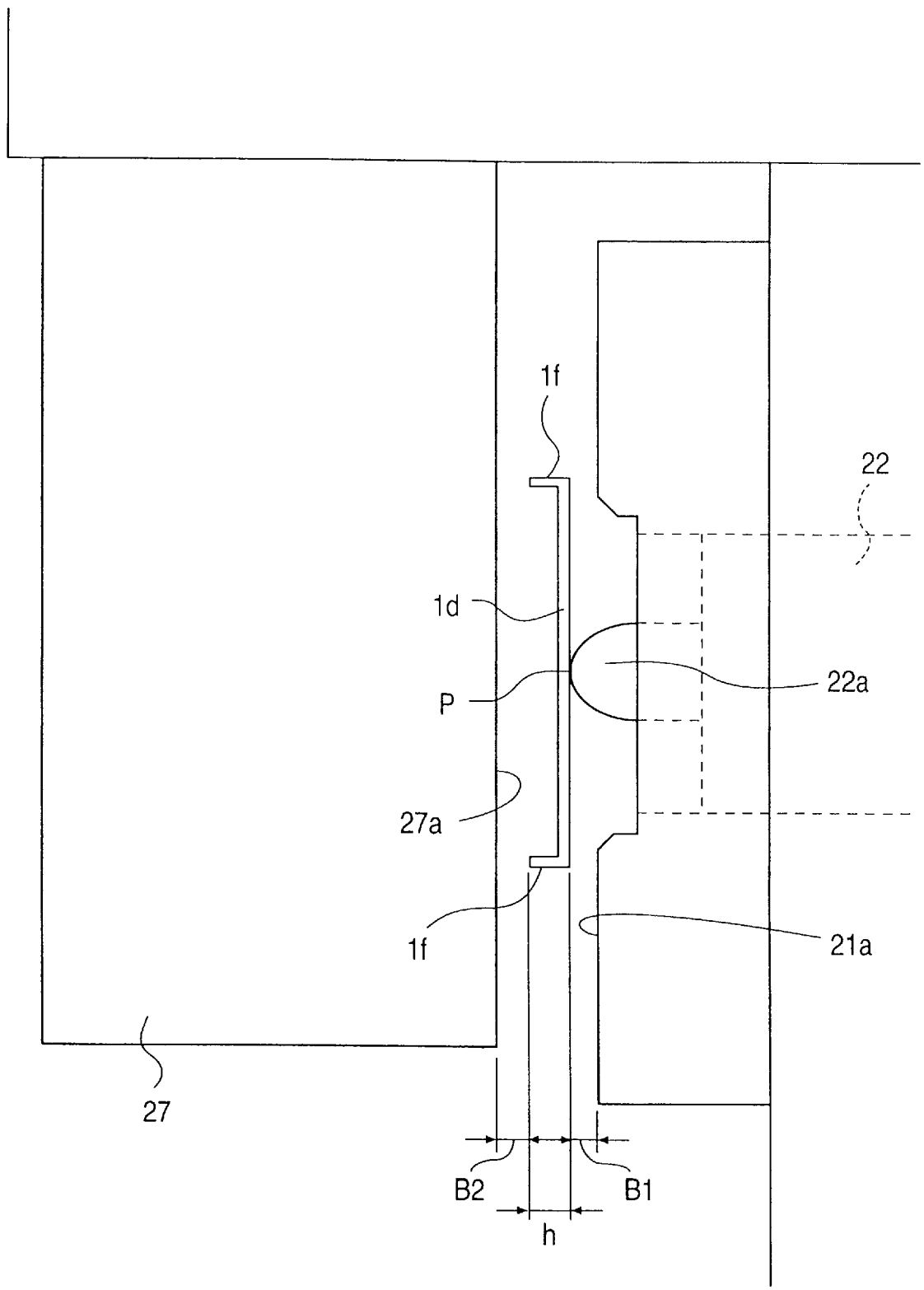
FIG. 6 is a partial enlarged view of FIG. 4.

As shown in FIG. 4, and in FIG. 6 in an enlarged state, the surface of the support base 21 facing the arm portion 1d constitutes a constraining portion 21a. Further, a constraining shaft 27 is provided at a position facing the constraining portion 21a with the arm portion 1d of the head unit H being placed therebetween. This constraining shaft 27 extends in the Y-direction, and the portion thereof facing the arm portion 1d constitutes a constraining portion 27a. When the arm portion 1d abuts this constraining portion 27a, the contact portion is in the form of a straight line extending in the Y-direction. In FIG. 5, the linear constraining portion 27a constituting the portion abutting the arm portion 1d is indicated by symbol L (27a). The constraining shaft 27 can be pulled out in the Y (+) direction in FIG. 4; after the support member 12 has been secured to the support base 11, and the arm portion 1d of the plate spring 1 has been placed in front of the the constraining portion 21a, the constraining shaft 27 is mounted in the Y (−) direction, and the arm portion 1d of the plate spring 1 is positioned between the constraining portion 21a and the constraining portion 27a.

Next, an inspecting method and a correcting method for a head unit using the above-described head unit inspecting apparatus (inspecting/correcting apparatus) will be described.

In the condition in which the support member 12 is detached from the support base 11, the fastening portion 1a at the base of the the plate spring 1 of the head unit H shown in FIG. 7, which is the object of inspection, is positioned on the fastening surface 12a of the support member 12 and secured thereto. Next, this support member 12 is secured to the support base 11. At this time, the arm portion 1d of the plate spring 1 of the head unit H fastened to the support member 12 faces the constraining portion 21a in the upper portion of the support base 21. Next, when the constraining shaft 27 is mounted in the Y (−) direction, the arm portion 1d is positioned between the constraining portion 21a and the constraining portion 27a.

At the instant that the support member 12 is fastened to the support base 11, the arm portion 1d is poised for press contact with the constraining portion 21a due to the pressurizing force in the Z (−) direction of the plate spring 1. However, since the pressurizing shaft 22 is pressurized in the Z (+) direction by the pressurizing member 24, the pressurizing pin 22a presses the arm portion 1d at the pressurizing point P in the Z (+) direction, and the plate spring 1 is pressed by the pressurizing pin 22a to be thereby deflected. At this time, the pressurizing force in the Z (+) direction of the pressurizing shaft 22 is adjusted, and, as shown in FIG. 6, the arm portion 1d is spaced apart from the constraining portion 21a by a small distance B1, and the forward end of the flanges 1f of the arm portion 1d is spaced apart from the constraining portion 27a by a distance B2.

When the pressurizing pin 22a pressurizes the arm portion 1d, mainly the elastically deformable portion 1c of the plate spring 1 deflects. The deflection amount of the elastically deformable portion 1c when the arm portion 1d, which is between the constraining portion 21a and the constraining portion 27a, is in contact with neither of these constraining portions is set so as to be the same or substantially the same as the deflection amount when the head unit H is mounted on the magnetic recording/reproducing apparatus and the slider 4 faces the surface of the magnetic recording medium (hard disk), with the Z-height being given.

In this condition, a spot image of a detection beam is formed on the opposing surface 4a of the slider 4 by the autocollimator 14 constituting the measuring means, and, by observing this spot image, it is possible to check the direction in which the slider 4 is inclined. Since the fastening portion 1a at the base of the plate spring 1 of the head unit H is secured in position, and the arm portion 1d thereof is pressurized by the pressurizing pin 22a, with a displacement amount corresponding to the Z-height at the time of mounting being given, the inclination of the opposing surface 4a of the slider 4 substantially corresponds to the inclination with respect to the magnetic recording medium in the condition in which the head unit is mounted on the magnetic recording/reproducing apparatus.

At the point in time that the inclination of the opposing surface 4a of the slider 4 is measured, when the inclination amount in the roll direction (around the X-axis) of the slider 4 is not smaller than the permissible value, a correcting operation is conducted. In this correcting operation, as shown in FIGS. 3 and 5, the forward end portion of the arm portion 1d protruding beyond the constraining portions 21a and 27a is held by the tool 30. This tool 30 consists, for example, of a pincette. When the forward end portion of the arm portion 1d is held by the tool 30 and twisted, the arm portion 1d is constrained by the constraining portion 21a and the constraining portion 27a, and a twisting force is applied to the forward end portion thereof. Due to this twisting operation, a portion of the arm portion 1d undergoes twisting deformation. While conducting this correcting operation, the inclination of the opposing surface 4a of the slider 4 is observed by the autocollimator 14, and the correcting operation is completed when the inclination of the opposing surface 4a has got in the range of the permissible value.

In this inspection method and correction method, the arm portion 1d of the plate spring 1 is pressed at one point (the pressurizing point P) at the forward end of the pressurizing pin 22a in the center line O, and a deflection equivalent to that when the Z-height is given is set. Thus, the condition of the slider 4 when the inclination of the slider 4 is measured by the autocollimator 14 is substantially the same as when it actually faces the magnetic recording/reproducing medium (hard disk). Further, the arm portion 1d is not pressurized by the entire constraining portion 21a to impart deflection to the elastically deformable portion 1c, but the pressurizing force is only applied to one point of the arm portion 1d (the pressurizing point P) to impart deflection to the elastically deformable portion 1c, so that, as shown in FIG. 8, the same condition as the Z-height can be easily set.

Further, when the twisting correcting force is applied to the forward end portion of the arm portion 1d by the tool 30, the arm portion 1d is constrained by the constraining portions 21a and 27a on either side through minute distances B1 and B2. At this time, by appropriately setting the distances B1 and B2, it is possible to prevent the twisting correcting force imparted to the arm portion 1d from influencing the elastically deformable portion 1c, so that it is possible to prevent plastic deformation being generated in the elastically deformable portion 1c. Conversely, when the twisting correcting force is imparted to the arm portion 1d, it is desirable that the distances B1 and B2 be in a range which does not cause plastic deformation in the twisting direction to be generated in the elastically deformable portion 1c.

When the twisting correction of the arm portion 1d is effected by the tool 30, the arm portion 1d is constrained by the constraining portion 21a and the constraining portion 27a. Since the constraining portion 27a is a part of the peripheral surface of the constraining shaft 27 having a circular cross section, when the twisting correcting force is imparted, the arm portion 1d is constrained by the straight line L (27a) extending in the Y-direction on the outer peripheral surface of the constraining portion 27a. Thus, during the twisting operation, the arm portion 1d supported by the straight line L (27a) is corrected mainly in the roll direction (around the X-axis), and deformation in the pitch direction (around the Y-axis) is not easily generated in the arm portion 1d. This will be explained in more detail. If the constraining portion 27 had a rectangular cross-sectional configuration and the arm portion 1d were constrained by a large area of the constraining portion 27a, the arm portion 1d would be in contact with the constraining portion 27a by the diagonal line indicated by symbol La in FIG. 5 when the twisting force is imparted to the arm portion 1d by the tool 30. In this case, not only the bending force in the roll direction but also the bending force in the pitch direction would act on the arm portion 1d, thereby generating an unnecessary bending in the pitch direction in the arm portion 1d.

When, in contrast, a constraining shaft 27 in the form of a round bar is used, the arm portion 1d abuts the constraining portion 27a through the straight line L (27a) during the correcting operation, so that no unnecessary deformation in the pitch direction is generated in the arm portion 1d.

In the above correction method, the inclination in the roll direction of the slider 4 can be corrected substantially under the same condition as when the head unit H is mounted on the magnetic recording/reproducing apparatus, and the slider 4 faces the surface of the magnetic recording/reproducing medium (hard disk).

Figure 10A:
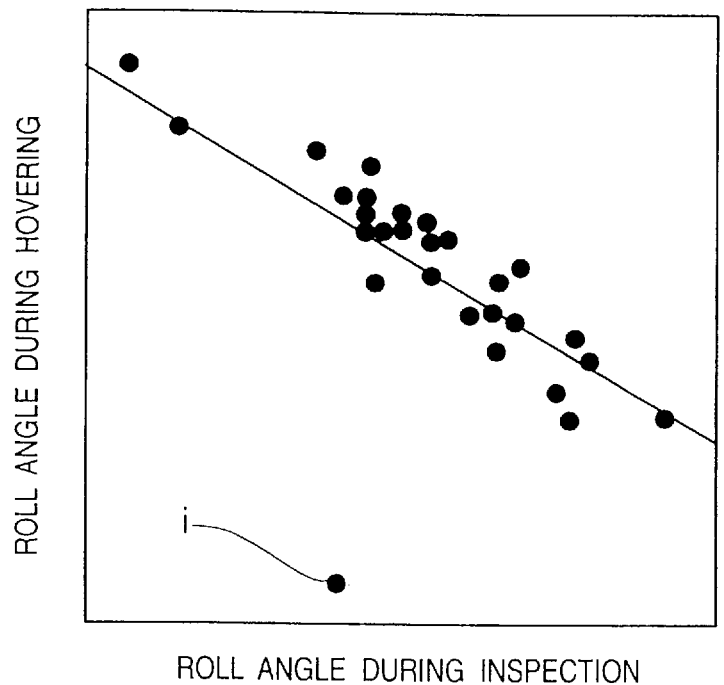
Figure 10B:
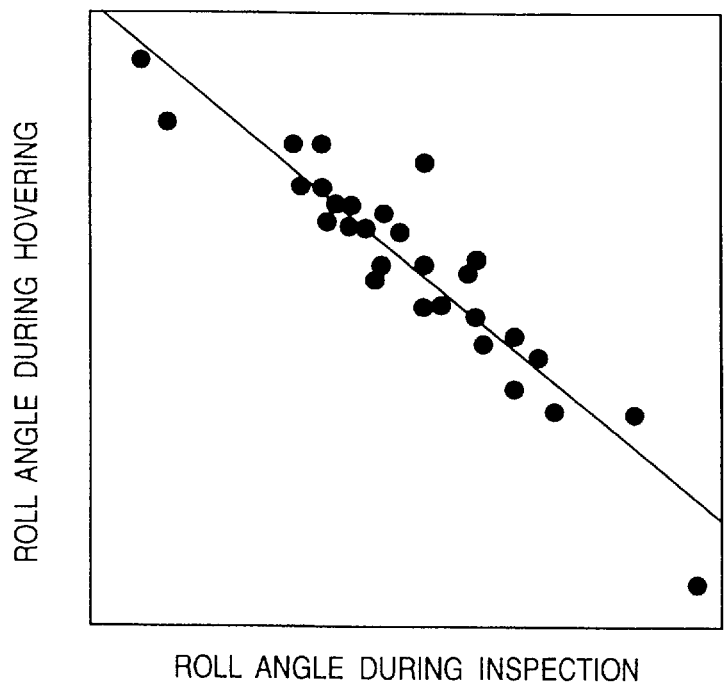

FIGS. 10A and 10B show the difference between the inspection method of the present invention and the conventional inspection method.

FIG. 10A shows measurement results obtained by the conventional inspection method, in which the arm portion 1d of the head unit H is positioned and fastened to an inspection jig, and the inclination of the opposing surface 4a of the slider 4 is measured, with no deflection in the Z-height direction being imparted to the plate spring 1. In FIG. 10A, the horizontal axis indicates the inclination in the roll direction of the opposing surface 4a of the slider 4 when inspection is performed by the above method, and the vertical axis indicates the inclination angle in the roll direction of the opposing surface 4a of the slider 4 when the head unit is mounted on the magnetic recording/reproducing apparatus after inspection, the slider 4 is caused to face the magnetic recording medium and the magnetic recording medium is run to impart a hovering force due to an airflow to the opposing surface 4a of the slider 4.

In FIG. 10A, the inclination angle of the slider 4 at the time of inspection is in many cases in a linear relationship with the inclination angle when the slider 4 hovers. However, as indicated by (i), there is a case in which the roll angle of the slider 4 at the time of inspection differs to an extreme degree from that when the the slider hovers. This means that the result of the inspection in which the inclination angle of the slider 4 is measured with the arm portion 1d of the plate spring 1 being fixed does not necessarily coincide with the inclination in the roll direction of the slider 4 hovering over the magnetic recording medium.

In FIG. 10B, the horizontal axis indicates the results of the inspection of the inclination angle in the roll direction of the slider 4 when the fastening portion 1a at the base of the plate spring 1 is fixed by using the inspection apparatus of the present invention, and the arm portion 1d is pressed by the pressurizing pin 22a to impart deflection to the elastically deformable portion 1c to give Z-height with respect to the slider 4. The vertical axis indicates the inclination in the roll direction of the slider 4 when the head unit is actually mounted on the magnetic recording/reproducing apparatus and the slider 4 is caused to hover over the the surface of the magnetic recording medium. In FIG. 10B, the inclination angle of the slider 4 during inspection is substantially in one-to-one correspondence with the inclination of the slider 4 when it hovers, there being no extreme difference as indicated by (i) in FIG. 10A.

Thus, it can be seen that the measurement result obtained by the inspection of the present invention corresponds with high very high accuracy to the inclination of the slider 4 when the head unit is mounted on the magnetic recording/reproducing apparatus.

Next, the positions of the constraining portions 21a and 27a and the optimum values of the gap sizes B1 and B2 shown in FIG. 6 when twisting correcting force is applied to the arm portion 1d of the plate spring 1 will be described.

First, the distance La between the slider 4 and the constraining members such as the constraining shaft 27 and the support base 21 shown in FIG. 3 must be a dimension which allows entrance of the tool 30 consisting of a pincette or the like. It is desirable for La to be 3 mm or more.

Further, when a twisting force is applied to the arm portion 1d by the tool 30, the arm portion 1d is constrained by the constraining portions 21a and 27a, so that, when the positions of the constraining portions 21a and 27a are close to the elastically deformable portion 1c of the plate spring 1, there is a concern that the elastically deformable portion 1c will undergo plastic deformation due to the twisting force applied to the arm portion 1d. Thus, it is desirable for the position where the constraint by the constraining portions 21a and 27a is effected to be sufficiently spaced apart from the elastically deformable portion 1c.

As shown in FIG. 5, assuming that the length of the elastically deformable portion 1c connected to the end portion of the fastening portion 1a of the plate spring 1 is Lc, and that the distance between the above-mentioned end portion and the constrained portion constrained by the constraining portions 21a and 27a is Lb, it is desirable that Lb be not less than twice Lc, and, more preferably, not less than three times Lc. In the example shown in FIG. 5, Lb is not less than three times Lc; it is set at approximately 3.3 times Lc.

Figure 11:
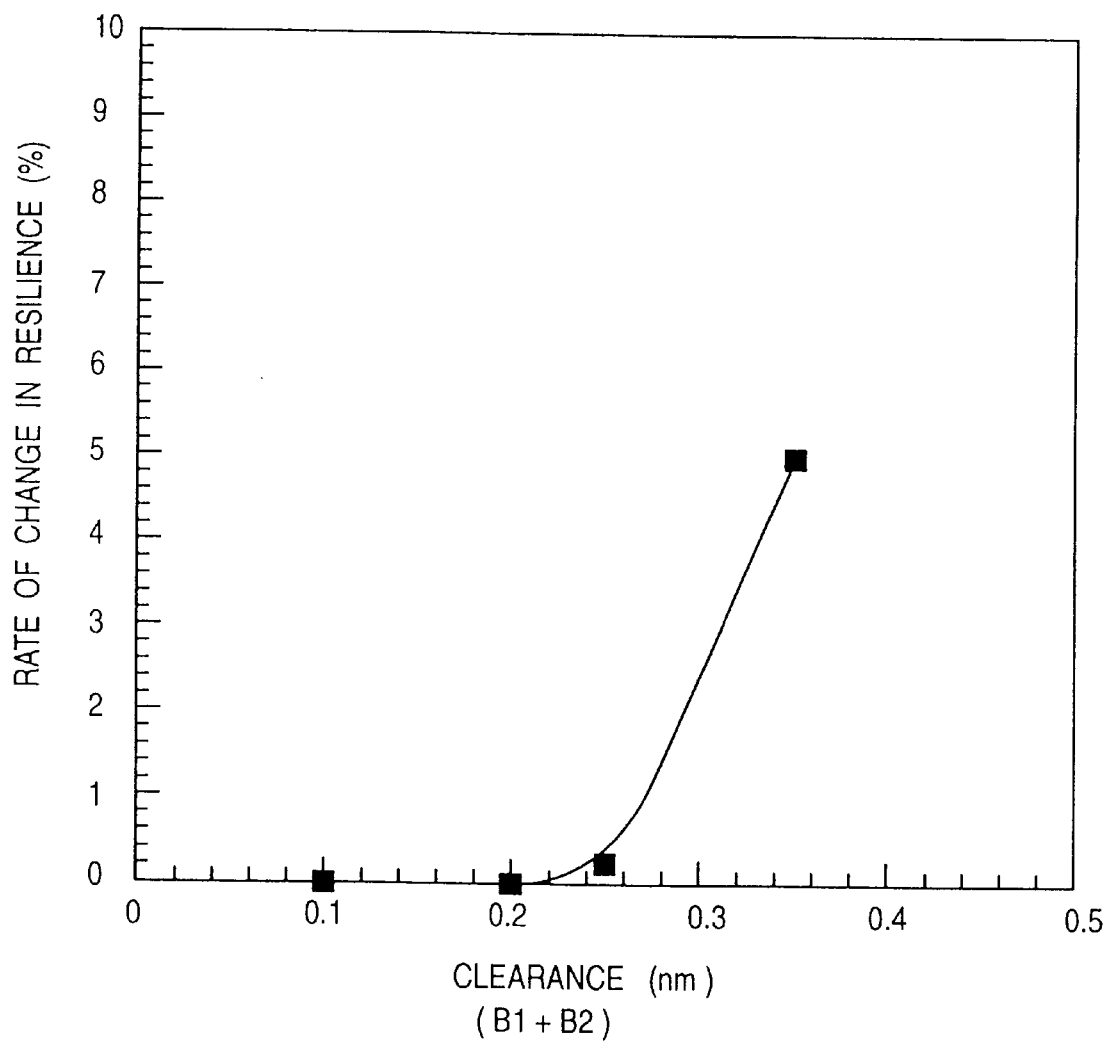
FIG. 11 is a chart showing the relationship between the constraint clearance of the plate spring and the rate of change in resilience when correcting the plate spring by the inspection method of the present invention.

Next, FIG. 11 is shows the results of an experiment in which an optimum range of the constraining clearance for the arm portion 1d was obtained.

In this experiment, the width dimension of the arm portion 1d of the plate spring 1 in the section corresponding to the constraining line L (27a) was 3 mm, the height dimension of the flanges 1f formed by bending the side portions of the arm portion 1d was 0.1 mm, and the above-mentioned Lb was three times Lc or more (approximately 3.3 times Lc).

In this condition, the gap dimensions B1 and B2 (See FIG. 6) between the constraining portion 21a and the constraining portion 27a were varied, and a twisting force of 3° was applied to the arm portion protruding beyond the constrained portion.

In FIG. 11, the horizontal axis indicates the sum total of the gap dimensions (B1 and B2) in mm, and the vertical axis indicates in % the rate of change in the resilience in the direction of the magnetic recording medium applied to the slider 4 before and after the correction of the plate spring in the condition in which the head unit is mounted in the magnetic recording/reproducing apparatus.

When the sum total of the gap dimensions (B1+B2) is 0.1 mm or less, no gap is formed between the arm portion 1d and the constraining portions 21a and 27a when there is a great variation in the height dimension h of the flanges 1f; when the constraining shaft 27 is set by being moved in the X (–) direction, the constraining shaft 27 comes into contact with the flanges If to deform the gimbal. When the value of B1+B2 becomes larger than 0.2 mm, a fluctuation is generated in the rate of change in the resilience applied to the slider 4, and when the value of B1+B2 becomes larger than 0.25 mm, the rate of change further increases.

This means that when the gap between the constraining portions 21a and 27a increases, plastic deformation is generated in the elastically deformable portion 1c due to the twisting deforming force applied to the arm portion 1d.

From the above description, when the height dimension h of the flanges 1f is 0.1 mm, the sum total (B1+B2) of the gap dimensions between the constraining portions becomes larger than 0.1 mm; this value is preferably 0.25 mm or less, and more preferably, 0.2 mm or less.

In the present invention described above, it is possible to measure the inclination of the slider due to the twisting deformation of the entire plate spring of the head unit. Further, it is possible to measure the inclination of the slider in correspondence with the state in which the head unit is mounted on the apparatus.

Further, when performing the operation of correcting the plate spring by using this measurement method, it is possible to correct the twisting deformation of the entire plate spring and the deformation of the plate spring in the condition in which the Z-height is given.

Thus, it is possible to perform inspection and correcting operation with high accuracy,

What is claimed is:

1. A head unit inspecting apparatus for a head unit which includes a slider which has at least one of a magnetic recording portion and a magnetic reading portion and which is opposed to a recording medium, and a plate spring which supports the slider and which has a fastening portion to be fastened to an apparatus, the plate spring generating a predetermined amount of deflection in a using condition in which the slider is opposed to the recording medium to impart a predetermined resilient force in the direction of the recording medium to the slider, the head unit inspecting apparatus comprising: a support member for fastening the fastening portion of the plate spring; a pressurizing member which imparts an amount of deflection corresponding to the condition in which the slider is opposed to the recording medium to the plate spring; and an inclination measuring means for measuring the inclination of the surface of the slider opposed to the recording medium, with the plate spring being pressurized by the pressurizing member.

2. A head unit inspecting apparatus according to claim 1, wherein the plate spring comprises: a base portion fastened to an apparatus; an elastically deformable portion in front the base portion; an arm portion which is in front of the elastically deformable portion and which is restrained in terms of elastic deformation; and a slider support portion which is at the forward end of the arm portion, the pressurizing member being provided at a position where the arm portion can be pressurized.

3. A head unit inspecting apparatus according to claim 2, wherein there is provided a constraining member for constraining the arm portion in the thickness direction through the intermediation of a gap, with the arm portion being pressurized by the pressurizing member so that a predetermined amount of deflection is imparted to the elastically deformable portion of the plate spring, the arm portion being constrained, leaving a correctable portion in front of it.

4. A head unit inspecting apparatus according to claim 3, wherein the size of the gap between the constraining member and the arm portion is such that no plastic deformation is generated in the elastically deformable portion when a correcting force is applied to the arm portion which is in front of the constraining member.

5. A head unit inspecting method for a head unit which includes a slider which has at least one of a magnetic recording portion and a magnetic reading portion and which is opposed to a recording medium, and a plate spring which supports the slider and which has a fastening portion to be fastened to an apparatus, the plate spring generating a predetermined amount of deflection in a using condition in which the slider is opposed to the recording medium to impart a predetermined resilient force in the direction of the recording medium to the slider, wherein the fastening portion of the plate spring is fastened and an amount of deflection corresponding to the using condition in which the slider is opposed to the recording medium is imparted to the plate spring, the inclination of the surface of the slider opposed to the recording medium being measured, with said deflection being imparted to the plate spring.

6. A head unit inspecting method according to claim 1, wherein the plate spring includes a fastening portion to be fastened to an apparatus, an elastically deformable portion in front of the fastening portion, an arm portion which is in front of the elastically deformable portion and which is restrained in terms of elastic deformation, and a slider support portion at the forward end of the arm portion, the arm portion being pressurized to impart deflection to the elastically deformable portion.

7. A head unit inspecting method according to claim 6, wherein, after the measurement of the inclination of the slider surface opposed to the recording medium, the arm portion is constrained through the intermediation of a gap in the thickness direction, and a correcting force is applied to the arm portion at a position in front of the constrained portion to correct the inclination of the slider.

8. A head unit inspecting method according to claim 7, wherein the size of the gap when constraining the arm portion through the intermediation of the gap is such that no plastic deformation is generated in the elastically deformable portion when the correcting force is applied to the arm portion.

* * * * *

UNITED STATES PATENT AND TRADEMARK OFFICE
CERTIFICATE OF CORRECTION

PATENT NO. : 5,959,450
DATED : September 28, 1999
INVENTOR(S) : Michiaki Moroe et al.

It is certified that error appears in the above-indentified patent and that said Letters Patent is hereby corrected as shown below:

<u>In the Claims</u>

In claim 2, line 3, after "front" insert --of--.

In claim 6, line 1, change "1" to --5--.

Signed and Sealed this

Sixteenth Day of May, 2000

Attest:

Q. TODD DICKINSON

*Attesting Officer*     *Director of Patents and Trademarks*